United States Patent
Hakala

(10) Patent No.: US 8,580,443 B2
(45) Date of Patent: Nov. 12, 2013

(54) METHOD AND ARRANGEMENT FOR CONTROLLING ANODE RECIRCULATION FOR FUEL CELLS USING A STEAM JET EJECTOR

(75) Inventor: Tuomas Hakala, Helsinki (FI)

(73) Assignee: Convion Oy, Espoo (FI)

( * ) Notice: Subject to any disclaimer, the term of this patent is extended or adjusted under 35 U.S.C. 154(b) by 0 days.

(21) Appl. No.: 13/458,624

(22) Filed: Apr. 27, 2012

(65) Prior Publication Data

US 2012/0214076 A1    Aug. 23, 2012

Related U.S. Application Data

(63) Continuation of application No. PCT/FI2010/050704, filed on Sep. 14, 2010.

(30) Foreign Application Priority Data

Oct. 30, 2009   (FI) .................................... 20096128

(51) Int. Cl.
*H01M 8/04*     (2006.01)
*H01M 8/06*     (2006.01)

(52) U.S. Cl.
USPC ........... 429/414; 429/408; 429/413; 429/415; 429/427; 429/444

(58) Field of Classification Search
USPC .................. 429/427, 444, 408, 413, 414, 415
See application file for complete search history.

(56) References Cited

U.S. PATENT DOCUMENTS

| | | | |
|---|---|---|---|
| 4,769,297 A * | 9/1988 | Reiser et al. .................. | 429/413 |
| 6,434,943 B1 | 8/2002 | Garris | |
| 2002/0039673 A1 | 4/2002 | Garris | |
| 2005/0106429 A1 * | 5/2005 | Keefer ............................ | 429/20 |

FOREIGN PATENT DOCUMENTS

| | | |
|---|---|---|
| JP | 11-260386 A | 9/1999 |
| JP | 2006-318938 A | 11/2006 |
| JP | 2007-128680 A | 5/2007 |
| JP | 2008-282599 A | 11/2008 |
| WO | 2006/010212 A1 | 2/2006 |

OTHER PUBLICATIONS

Marsano et al., "Ejector Performance Influence on a Solid Oxide Fuel cell Anodic Recirculation Systems" Journal of Power Sources, (2004), vol. 129, pp. 216-228.

(Continued)

*Primary Examiner* — Sean P Cullen
(74) *Attorney, Agent, or Firm* — Buchanan Ingersoll & Rooney PC

(57) ABSTRACT

A fuel cell system arrangement is disclosed for controlling an Oxygen-to-Carbon (O/C) relationship by providing water to an anode side fuel recirculation, pumping the provided water to facilitate a water flow, and evaporating water from the facilitated water flow for generating pressurized steam having at least the motive pressure for a steam jet-ejector. The at least one steam jet-ejector can inject at least part of the steam to the fuel cell system, and entrain part of an essentially low pressure anode exhaust gas stream in the anode side gas recirculation and compress the gas mixture to an intermediate pressure of the fuel feed-in stream for controlling the Oxygen-to-Carbon (O/C) relationship in the fuel side of the fuel cell system.

16 Claims, 4 Drawing Sheets

(56) References Cited

OTHER PUBLICATIONS

International Search Report (PCT/ISA/210) issued on Jan. 3, 2011, by Finnish Patent Office as the International Searching Authority for International Application No. PCT/FI2010/050704.

Written Opinion (PCT/IPEA/408) issued on Jan. 3, 2011, by Finnish Patent Office as the International Searching Authority for International Application No. PCT/FI2010/050704.

Search Report issued on Jul. 20, 2010, by Finnish Patent Office for Application No. 20096128.

* cited by examiner

METHOD AND ARRANGEMENT FOR CONTROLLING ANODE RECIRCULATION FOR FUEL CELLS USING A STEAM JET EJECTOR

RELATED APPLICATION

This application claims priority as a continuation application under 35 U.S.C. §120 to PCT/FI2010/050704, which was filed as an International Application on Sep. 14, 2010 designating the U.S., and which claims priority to Finnish Application 20096128 filed in Finland on Oct. 30, 2009. The entire contents of these applications are hereby incorporated by reference in their entireties.

FIELD

Due in part to environmental issues, new energy sources that are environmentally friendly and with good efficiency have been developed. Fuel cell devices are promising future energy conversion devices by which fuel, for example bio gas can be directly transformed to electricity via a chemical reaction in an environmentally friendly process.

BACKGROUND INFORMATION

An exemplary fuel cell, as presented in FIG. 1, includes an anode side 100 and a cathode side 102 and an electrolyte material 104 between them. In solid oxide fuel cells (SOFCs) oxygen is fed to the cathode side 102 and it is reduced to a negative oxygen ion by receiving electrons from the anode. The negative oxygen ion goes through the electrolyte material 104 to the anode side 100 where it reacts with the used fuel producing water and, for example, carbon dioxide ($CO_2$). Between the anode 100 and the cathode 102 is an external electric circuit 111 having a load 110 for the fuel cell.

FIG. 2 shows a SOFC device as an example of a high temperature fuel cell device. SOFC devices can utilize for example natural gas, bio gas, methanol or other hydrocarbon containing compounds as fuel, which is fed via feed for gas used as fuel 108 to the anode side(s) 100. The SOFC device system in FIG. 2 includes multiple fuel cells in one or more stack formations 103 (SOFC stack(s)). A larger SOFC device system includes many fuel cells in several stacks 103. Each fuel cell includes anode 100 and cathode 102 structures as presented in FIG. 1. Part of the used fuel may be recirculated in feedback arrangement 109. SOFC device in FIG. 2 also comprises a fuel heat exchanger 105 and a reformer 107. Heat exchangers are used for controlling thermal conditions in the fuel cell process and there can be more than one of them in different locations of a SOFC device. The extra thermal energy in circulating gas is recovered in one or more heat exchangers 105 to be utilized in the SOFC device or externally. Reformer 107 is a device that converts the fuel such as for example natural gas to a composition suitable for fuel cells, for example to a composition containing all or at least some of the following: hydrogen, methane, carbon dioxide, carbon monoxide, inert gases and water. Anyway in each SOFC device it is though not necessary to have a reformer.

By using a measurement means 115 (such as a fuel flow meter, current meter, temperature meter and the like) desired measurements for the operation of the SOFC device are carried out. Only part of the anode exhaust gas is recirculated in the feedback arrangement 109 and the other part of the gas 114 is oxidized in a post oxidation device such as a burner.

Fuel cells are electrochemical devices converting chemical energy of reactants directly to electricity and heat.

Fuel cell systems have the potential to significantly exceed the electrical and CHP (Combined production of Heat and Power) efficiency of known energy production technologies of comparable size. Fuel cell systems are widely appreciated as a key future energy production technology.

In the solid oxide fuel cell (SOFC) system, for example a partially reformed hydrogen rich fuel gas mixture is fed to the anode side of the fuel cells while air is lead to the cathode sides. Fuel oxidation reactions take place and hydrogen and other oxidizable compounds are converted into water and carbon dioxide while electric current is generated. Since reforming of hydrocarbon fuel involves steam, it is beneficial to recover water formed as the product of the fuel oxidation and to use the water for fuel reforming in the reformer 107, thus omitting a need for an external water feed to the system once the system is already up and generating electricity.

A practical method for recovering water formed as the product of fuel oxidation reactions in the fuel cell is anode off-gas recirculation. This method can improve overall fuel utilization compared to single passing operation of the fuel cells.

In known anodes, off-gas recirculation involves a compressor or other device for creating a pressure boost enough to overcome pressure drops in the fuel cell system and to provide mass flow of water vapour adequate for fuel steam reforming, a key control parameter being an Oxygen-to-Carbon (O/C) ratio of the fuel gas mixture.

In one known system embodiment, a high pressurized fuel feed is used as a motive stream in an jet-ejector to entrain anode tail gas and to increase pressure of the fuel gas mixture to overcome pressure losses in the fuel cell system components. For example in patent application document JP2008282599 (A) is presented this kind of system topology. These kinds of system topologies involve high pressure of the fuel feedstock and due to the fixed geometry of the jet-ejector, these topologies have a limited capability for controlling the re-circulation ratio and the resultant Oxygen-to-Carbon (O/C) ratio.

Recirculation carried out by a fan or a compressor provides added flexibility and controllability to the system but involves sophisticated, complex and potentially unreliable machinery. Both of the aforementioned methods often rely on inferred and thus inaccurate determination of Oxygen-to-Carbon (O/C) ratio since measurement of high temperature gas stream composition can be difficult and complicated.

SUMMARY

An arrangement is disclosed for controlling an Oxygen-to-Carbon (O/C) relationship in a fuel cell system for producing electricity with a fuel cell having an anode side, a cathode side and an electrolyte between the anode side and the cathode side, wherein the fuel cell system includes a feed for gas used as fuel to the anode side, a water supply, at least one water pump for pumping water to facilitate a water flow, and an evaporator for evaporating water from a facilitated water flow for generating pressurized steam, wherein the arrangement for controlling the Oxygen-to-Carbon (O/C) relationship comprises: means for condensing at least part of a water vapour fraction of essentially low pressure anode exhaust gas into a water supply for the arrangement; means for recirculating part of an anode side gas as a cooled and substantially dry gas; and at least one steam jet-ejector for injecting at least part of a pressurized steam flow to a fuel cell system, and for entraining part of the essentially low pressure anode exhaust gas stream in an anode side gas recirculation, and compressing a gas mixture to an intermediate pressure of a fuel feed-in stream for controlling the Oxygen-to-Carbon (O/C) relationship in a fuel side of the fuel cell system.

A method is also disclosed for controlling an Oxygen-to-Carbon (O/C) relationship in a fuel cell system for producing electricity with a fuel cell, in which method gas used as fuel is fed to an anode side of the fuel cell, water provided to the fuel cell system is pumped to facilitate a water flow. and water is evaporated from said facilitated water flow for generating pressurized steam having at least the motive pressure for a steam jet-ejector, wherein the method of controlling the Oxygen-to-Carbon (O/C) relationship comprises: providing water to the fuel cell system by condensing at least part of a water vapour fraction of essentially low pressure anode exhaust gas into a liquid; recirculating part of the anode side gas as a cooled and substantially dry gas; utilizing said at least one steam jet-ejector for injecting at least part of the pressurized steam to the fuel cell system; entraining part of the essentially low pressure anode exhaust gas stream to said anode side gas recirculation; and compressing a gas mixture to an intermediate pressure of a fuel feed-in stream for controlling the Oxygen-to-Carbon (O/C) relationship.

BRIEF DESCRIPTION OF THE DRAWINGS

In the drawings, exemplary embodiments are illustrate wherein.

DETAILED DESCRIPTION

Figure 1:
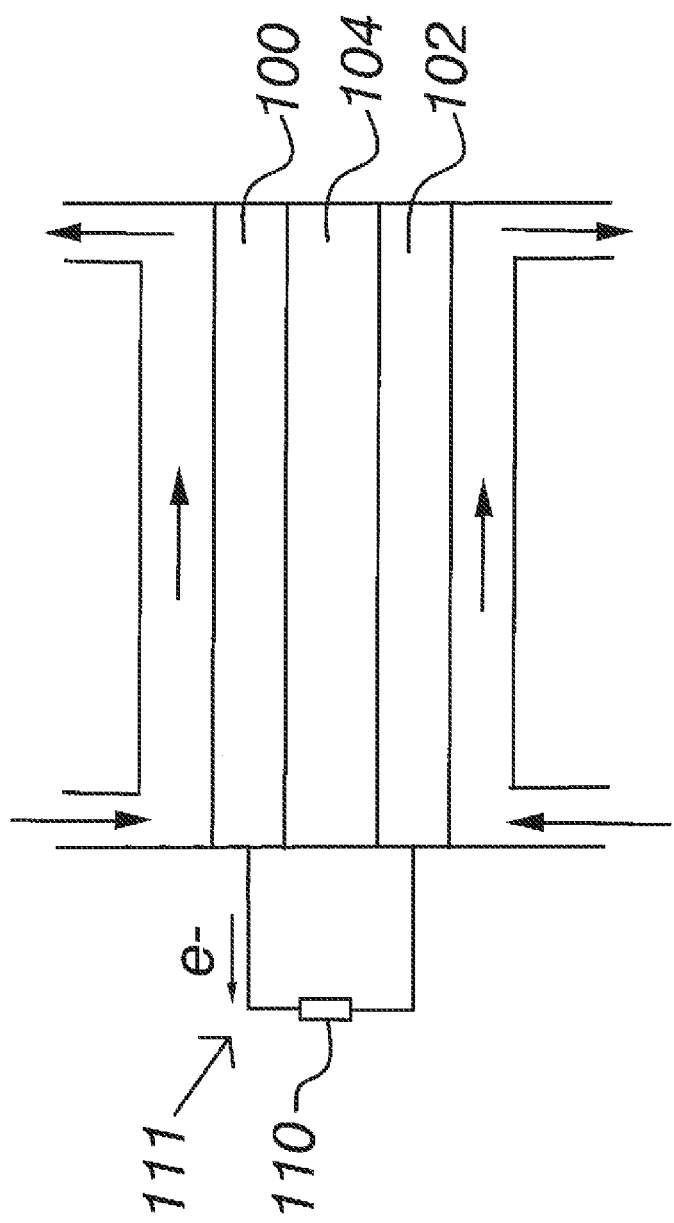
FIG. 1 presents am exemplary single fuel cell structure.
Figure 2:
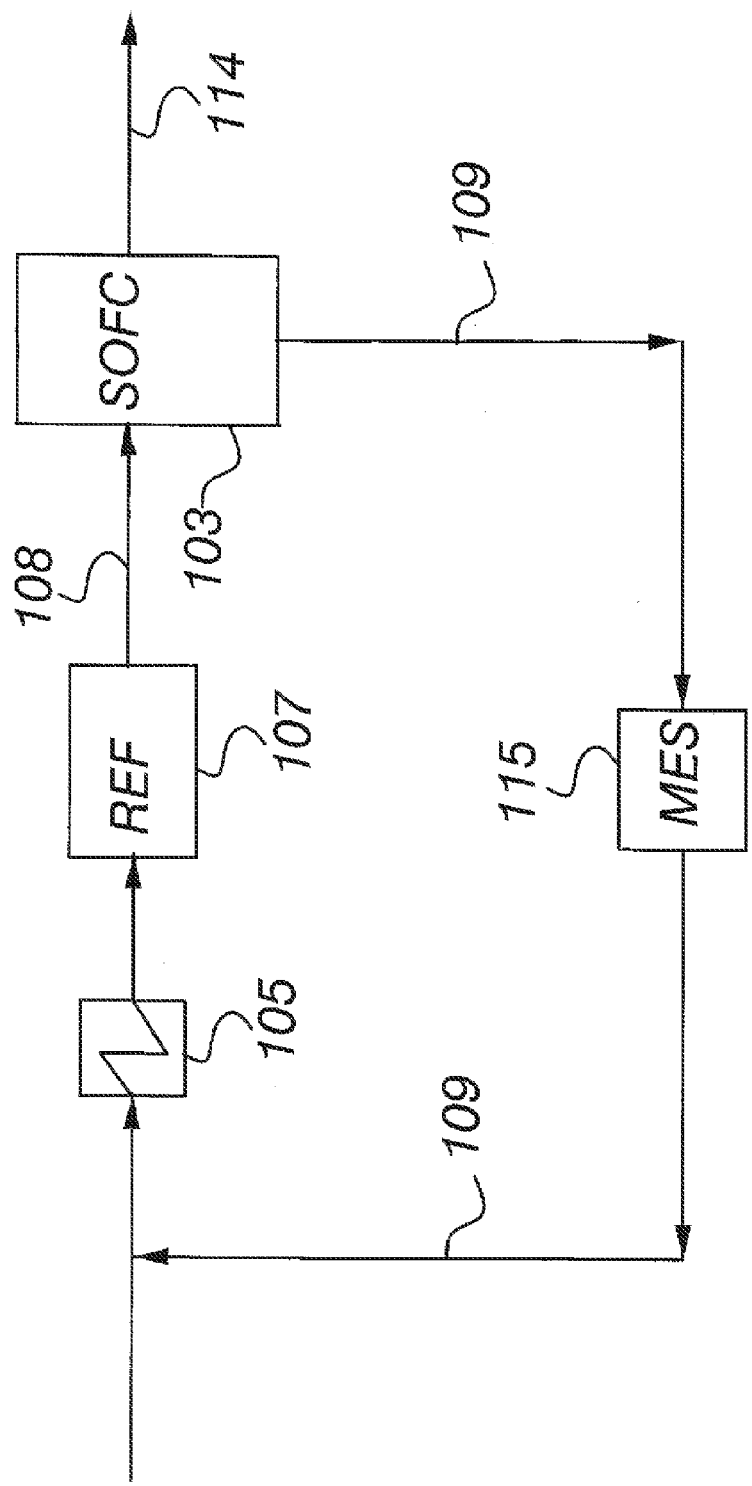
FIG. 2 presents an example of a SOFC device.

Exemplary embodiments provide a practical Oxygen-to-Carbon (O/C) relationship management in a fuel cell system by utilizing known system components. This can be achieved by an arrangement for controlling an Oxygen-to-Carbon (O/C) relationship in a fuel cell system for producing electricity with fuel cells, each fuel cell in the fuel cell system comprising an anode side, a cathode side and an electrolyte between the anode side and the cathode side. The fuel cell system comprises means for feeding gas used as fuel to the anode side, and means for recirculating part of the anode side gas. The arrangement for controlling an Oxygen-to-Carbon (O/C) relationship comprises means for providing water to the arrangement, at least one water pump for pumping the provided water to facilitate a water flow, means for evaporating water from said facilitated water flow for generating pressurized steam having at least the motive pressure for a steam jet-ejector, and said at least one steam jet-ejector injecting at least part of said steam to the fuel cell system and entraining part of the essentially low pressure anode exhaust gas stream in said anode side gas recirculation, and compressing the gas mixture to an intermediate pressure of the fuel feed-in stream for controlling Oxygen-to-Carbon (O/C) relationship in the fuel side of the fuel cell system.

A method is also disclosed for controlling an Oxygen-to-Carbon (O/C) relationship in a fuel cell system for producing electricity with fuel cells, in which method gas used as fuel is fed to the anode side and part of said gas is recirculated. An Oxygen-to-Carbon (O/C) relationship is controlled by providing water to the recirculation, pumping the provided water amount to facilitate a water flow, evaporating water from said facilitated water flow for generating pressurized steam having at least the motive pressure for a steam jet-ejector, and by utilizing the at least one steam jet-ejector for injecting at least part of the steam to the fuel cell system and entraining part of the essentially low pressure anode exhaust gas stream in the anode side gas recirculation, and compressing the gas mixture to an intermediate pressure of the fuel feed-in stream for controlling the Oxygen-to-Carbon (O/C) relationship in the fuel side of the fuel cell system.

Exemplary embodiments include pumping a provided water to facilitate a water flow in the anode recirculation and evaporating water from said facilitated water flow for generating pressurized steam having at least the motive pressure for a steam jet-ejector, which injects at least part of the steam to the fuel cell system and entrains part of the essentially low pressure anode exhaust gas stream in the anode side gas recirculation, and compresses the gas mixture to an intermediate pressure of the fuel feed-in stream for controlling the Oxygen-to-Carbon (O/C) relationship in the fuel side of the fuel cell system.

An exemplary benefit of the disclosed embodiments is that a successful control of the Oxygen-to-Carbon (O/C) relationship can be accomplished by utilizing known system components and thus fuel utilization can be increased in the fuel cell system.

Figure 3:
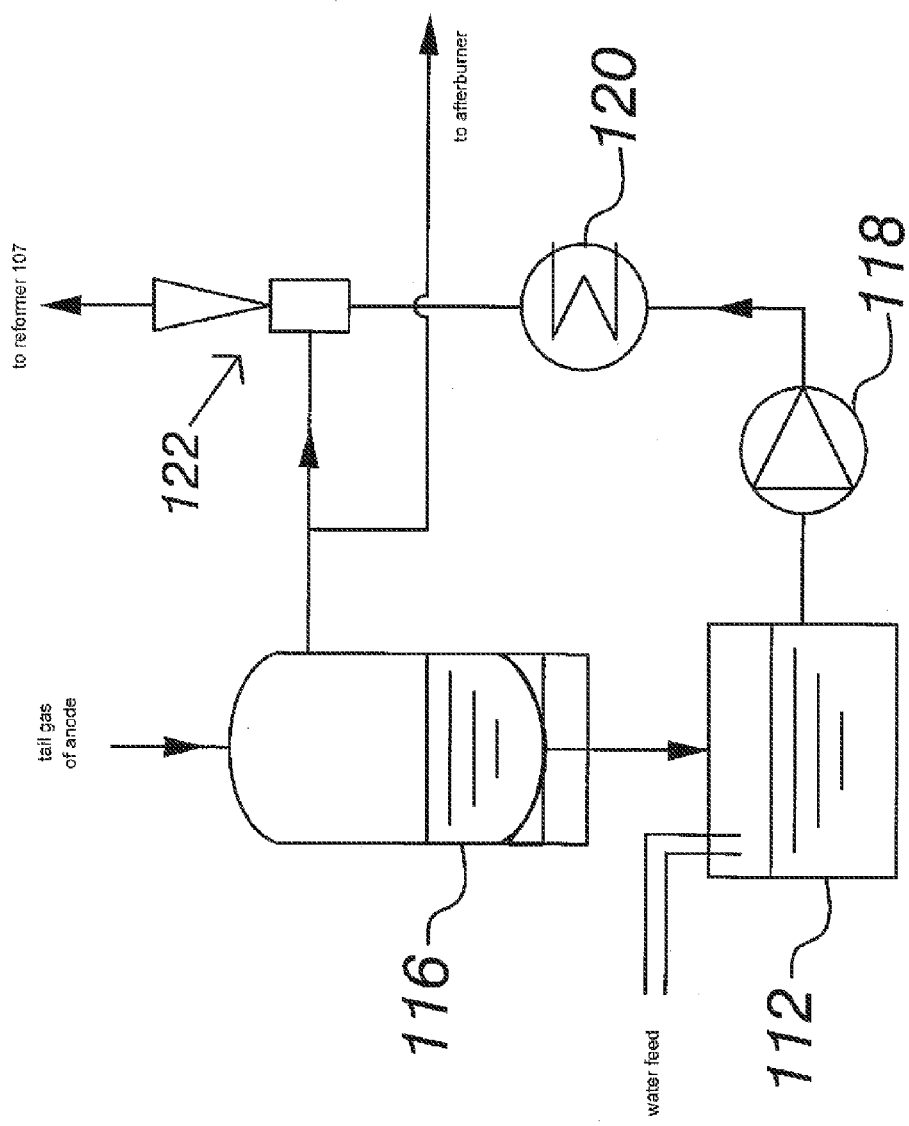
FIG. 3 presents a first exemplary preferred embodiment as disclosed herein.
Figure 4:
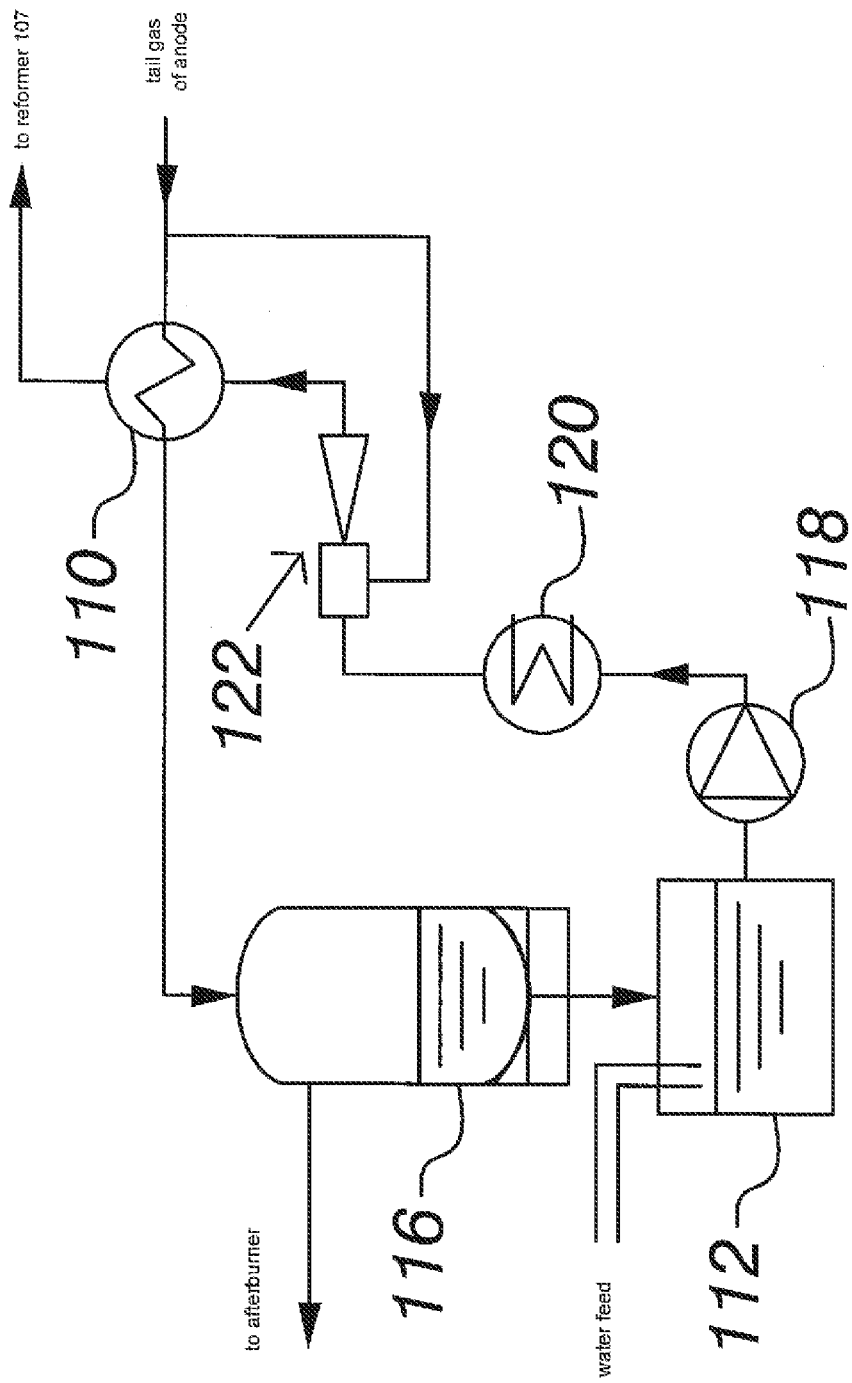
FIG. 4 presents a second exemplary preferred embodiment as disclosed herein.

Exemplary preferred embodiments of the present disclosure are described with respect to FIGS. 3 and 4. In FIG. 3, a first exemplary embodiment recirculates a cooled, dry anode gas fraction at a known temperature and water content. In FIG. 4, a second exemplary embodiment recirculates a hot anode gas and employs a heat exchanger 110.

At least for a start-up of the fuel cell system, an exemplary arrangement comprises as means 112 for providing water to the arrangement, a water tank 112 as an external water source 112. This anode exhaust gas stream is, for example, also used as a water source 112. thus, can comprise water, which is an oxidation product of fuel cell reactions. The anode exhaust stream or a part of it is led to a condenser 116 and liquid water is formed. Thus, the arrangement can achieve independence from other water feeds once the system has already been started up and is in most situations producing water in fuel cell reactions. In this kind of exemplary embodiment, O/C management is facilitated without external water feed to the system, and the condenser 116 is a desired part of the arrangement.

The condenser 116 can operate by condensing at least part of the water vapour fraction of the anode exhaust gas to liquid and/or condensing at least part of the water vapour fraction of the at least partially post oxidized anode exhaust gas to liquid. The arrangement can also comprise a water storage 112 sufficient for fuel cell system start-up and needs of transient operational modes.

An exemplary arrangement can comprise at least a water pump 118, as means 120 for evaporating water a steam generator 120, such as a high pressure steam generator, and a steam jet-ejector 122, which is for example a jet pump. Also a boiler can be used as the steam generator 120. The jet-ejector can be considered in the broadest sense as a fluid dynamic device operating on the principle of interchanging momentum between a motive stream and a propelled stream and comprising at least a nozzle designed to increase fluid velocity while decreasing pressure, whose flow is directed to a diffuser designed to reduce fluid velocity and increase its pressure.

The water pump 118 can pump at a known mass flow value a water amount to facilitate a water flow in the anode gas recirculation according to an exemplary embodiment. The mass flow value can be known or determined, based on a measurement made before the fuel cell system operates, or online with the fuel system operation. Then the steam generator 120 generates pressurized steam of said water flow by evaporating water. This steam has at least the motive pressure for a steam jet-ejector 122 and for using the steam as a motive stream to the at least one steam jet-ejector 122 for ejecting at least part of the pressurized steam according to an entrainment ratio of the steam jet-ejector. The at least one steam jet-ejector 122 injects at least part of said steam to the fuel cell system and entrains part of the essentially low pressure anode exhaust gas stream in the anode side gas recirculation, and compresses the gas mixture to an intermediate pressure of the fuel feed-in stream for controlling an Oxygen-to-Carbon (O/C) relationship in the fuel side of the fuel cell system.

The at least one steam jet-ejector 122 entrains the recirculated gas into the steam stream from means 116 for condensing after at least partial water separation by the means 116 for condensing. The steam jet-ejector 122 can also entrain the recirculated gas into the steam stream from anode exhaust stream prior to condensing by means for condensing 116 or prior to oxidation by means for post oxidation.

In one exemplary embodiment the arrangement according to the invention comprises means 115 for performing at least temperature and mass flow value measurements to obtain measurement values, which are utilized in further controlling the Oxygen-to-Carbon (O/C) relationship in the fuel side of the fuel cell system.

As with SOFCs, exemplary embodiments can also be utilized with MCFCs (Molten Carbonate Fuel Cells), and/or with other known or to be developed fuel cells. MCFCs are high temperature fuel cells that use an electrolyte composed of a molten carbonate salt mixture suspended in a porous, chemically inert ceramic matrix.

Although exemplary embodiments have been presented in reference to the attached figures and specification, the invention is not limited to those embodiments.

Rather, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An arrangement for controlling an oxygen to carbon relationship in a fuel cell system for producing electricity with a fuel cell having an anode side, a cathode side and an electrolyte between the anode side and the cathode side, wherein the fuel cell system includes a feed for gas used as fuel to the anode side, a water supply, at least one water pump for pumping water to facilitate a water flow, and an evaporator for evaporating water from a facilitated water flow for generating pressurized steam, wherein the arrangement for controlling the oxygen to carbon relationship comprises:
   means for condensing at least part of a water vapour fraction of anode exhaust gas into the water supply for the arrangement;
   a feedback arrangement for recirculating part of an anode side gas as a substantially dry gas obtained from the means for condensing; and
   at least one steam jet-ejector connected to inject at least part of a pressurized steam flow to a fuel cell system, and entrain at least a part of the substantially dry gas in an anode side gas recirculation and compress a gas mixture to a pressure of a fuel feed-in stream for controlling the oxygen to carbon relationship in a fuel side of the fuel cell system.

2. An arrangement in accordance with claim 1, wherein the condensing means condenses at least part of the water vapour fraction of an at least partially post oxidized anode exhaust gas to liquid, to provide water to the arrangement.

3. An arrangement in accordance with claim 1, wherein the water supply is sufficient for fuel cell system start-up and for transient operational modes.

4. An arrangement in accordance with claim 1, wherein said at least one steam jet-ejector is provided for entraining a recirculated gas into a steam stream from the means for condensing after at least partial water separation by said means for condensing.

5. An arrangement in accordance with claim 1, wherein said at least one steam jet-ejector is provided for entraining a recirculated gas into a steam stream from anode exhaust stream prior to oxidation by a device for carrying out post oxidation.

6. An arrangement in accordance with claim 1, in combination with a fuel cell system comprising:
   the fuel cell anode side;
   the fuel cell cathode side;
   the feed for gas used as fuel to the anode side;
   the water pump for pumping water to facilitate the water flow; and
   the evaporator for evaporating water from the facilitated water flow for generating pressurized steam as a motive pressure for a steam jet-ejector.

7. An arrangement in accordance with claim 6, comprising: plural fuel cells.

8. An arrangement according to claim 1, wherein in a single loop from an outlet of the anode to an inlet of the anode, the steam jet-ejector is located downstream from the means for condensing.

9. An arrangement according to claim 8, wherein the substantially dry gas is directly introduced to the steam jet-ejector.

10. A method for controlling an oxygen to carbon relationship in a fuel cell system for producing electricity with a fuel cell, in which method gas used as fuel is fed to an anode side of the fuel cell, water provided to the fuel cell system is pumped to facilitate a water flow, and water is evaporated from said facilitated water flow for generating pressurized steam having at least motive pressure for a steam jet-ejector, wherein the method of controlling the oxygen to carbon relationship comprises:
   providing water to the fuel cell system by condensing at least part of a water vapour fraction of anode exhaust gas into a liquid;
   recirculating part of an anode side gas as a substantially dry gas formed from the condensation; utilizing said at least one steam jet-ejector for injecting at least part of the pressurized steam to the fuel cell system;
   entraining at least a part of the substantially dry gas in an anode side gas recirculation; and
   compressing a gas mixture to a pressure of a fuel feed-in stream for controlling the oxygen to carbon relationship.

11. A method in accordance with claim 10, wherein water is provided by condensing at least part of the water vapour fraction of an at least partially post oxidized anode exhaust gas to liquid.

12. A method in accordance with claim 10, comprising:
   using a water supply sufficient for fuel cell system start-up and for transient operational modes

13. A method in accordance with claim 10, comprising:
    entraining a recirculated gas into a steam stream from condensation after at least partial water separation made in condensation.

14. A method in accordance with claim 10, comprising:
    entraining a recirculated gas into the steam stream from anode exhaust stream prior to post oxidation.

15. A method according to claim 10, wherein in a single loop from an outlet of the anode to an inlet of the anode, the steam jet-ejector is located downstream from the means for condensing.

16. A method according to claim 15, wherein the substantially dry gas is directly introduced to the steam jet-ejector.

* * * * *